(12) United States Patent
Sugiyama et al.

(10) Patent No.: US 8,817,190 B2
(45) Date of Patent: Aug. 26, 2014

(54) IMAGE PROCESSING APPARATUS, IMAGE PROCESSING METHOD, AND COMPUTER PROGRAM

(75) Inventors: Mikiko Sugiyama, Yokohama (JP); Yosuke Hayase, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1075 days.

(21) Appl. No.: 12/323,307

(22) Filed: Nov. 25, 2008

(65) Prior Publication Data

US 2009/0135303 A1 May 28, 2009

(30) Foreign Application Priority Data

Nov. 28, 2007 (JP) ................................ 2007-307892
Nov. 28, 2007 (JP) ................................ 2007-307893

(51) Int. Cl.
*H04N 5/14* (2006.01)
*H04N 9/64* (2006.01)

(52) U.S. Cl.
CPC ....................................... *H04N 9/64* (2013.01)
USPC ........... 348/577; 348/169; 348/170; 348/452; 348/620; 348/669; 345/589; 345/590; 345/603; 345/604; 345/605; 345/620; 345/621; 345/623; 382/164; 382/165

(58) Field of Classification Search
USPC ........... 348/589, 650, 708, 577, 169; 382/165
See application file for complete search history.

(56) References Cited

U.S. PATENT DOCUMENTS

| | | | | |
|---|---|---|---|---|
| 4,931,865 A | * | 6/1990 | Scarampi ........................ | 725/12 |
| 6,219,043 B1 | * | 4/2001 | Yogeshwar et al. ............. | 341/55 |
| 6,570,588 B1 | * | 5/2003 | Ando et al. ..................... | 715/728 |
| 7,429,108 B2 | * | 9/2008 | Rosenberg ...................... | 351/209 |
| 7,729,563 B2 | | 6/2010 | Kameyama et al. | |

(Continued)

FOREIGN PATENT DOCUMENTS

| JP | 2004-120628 A | 4/2004 |
|---|---|---|
| JP | 2004-248312 | 9/2004 |

(Continued)

OTHER PUBLICATIONS

Mark D. Fairchild et al., "Image Appearance Modeling", SPIE/IS&T Electronic Imaging Conference, SPIE vol. 5007, 2003, pp. 149-160.*

(Continued)

*Primary Examiner* — Jefferey Harold
*Assistant Examiner* — Humam Satti
(74) *Attorney, Agent, or Firm* — Fitzpatrick, Cella, Harper & Scinto

(57) ABSTRACT

A general moving image includes a plurality of objects in a frame image. At the time of playback, the temporal visual characteristic is taken into consideration uniformly in the overall frame image. It is therefore impossible to perform playback while particularly considering an object of interest. In this invention, when playing back a moving image including a plurality of time-divided frame images, the object adaptation time of each object image is acquired first in the frame image of interest of the plurality of frame images. An adaptation weight is calculated based on the acquired object adaptation time, and a low-pass image reflecting the adaptation weight is generated for each object image. Color adaptation conversion using the low-pass image makes it possible to perform, for the frame image of interest, color conversion based on the adaptation time of each object image and perform color conversion particularly considering an object of interest.

7 Claims, 20 Drawing Sheets

(56) References Cited

U.S. PATENT DOCUMENTS

| | | |
|---|---|---|
| 8,078,010 B2 | 12/2011 | Kameyama et al. |
| 8,116,517 B2 | 2/2012 | Kuwabara et al. |
| 8,136,944 B2 * | 3/2012 | De Lemos .................... 351/209 |
| 8,275,219 B2 | 9/2012 | Kameyama et al. |
| 2004/0086193 A1 * | 5/2004 | Kameyama et al. .......... 382/254 |
| 2005/0276329 A1 * | 12/2005 | Adiletta et al. .......... 375/240.16 |
| 2005/0289582 A1 * | 12/2005 | Tavares et al. .................. 725/10 |
| 2006/0256867 A1 * | 11/2006 | Turaga et al. ............ 375/240.16 |
| 2007/0097104 A1 * | 5/2007 | Kuroki .......................... 345/204 |
| 2007/0127775 A1 * | 6/2007 | Moon et al. .................... 382/103 |
| 2008/0007654 A1 * | 1/2008 | Ryu et al. ...................... 348/564 |
| 2009/0125849 A1 * | 5/2009 | Bouvin et al. ................. 715/863 |
| 2009/0153730 A1 * | 6/2009 | Knee et al. .................... 348/445 |
| 2012/0106838 A1 | 5/2012 | Kuwabara et al. |
| 2012/0189066 A1 | 7/2012 | Kameyama et al. |
| 2012/0237084 A1 * | 9/2012 | De Lemos .................... 382/103 |

FOREIGN PATENT DOCUMENTS

| | | |
|---|---|---|
| JP | 2006-350577 A | 12/2006 |
| JP | 2007-006111 A | 1/2007 |
| WO | 2006-015092 A2 | 2/2006 |

OTHER PUBLICATIONS

Mark D. Fairchild et al., "Image Appearance Modeling", SPIE/IS&T Electronic Imaging Conference, SPIE vol. 50007, 2003, pp. 149-160.*

Mark D. Fairchild, et al., "Image Appearance Modeling", SPIE/IS&T Electronic Imaging Conference, SPIE vol. 5007, 2003, pp. 149-160.

* cited by examiner

FIG. 3

| 401 | 402 | 403 | 404 | 405 | 406 | 407 |
|---|---|---|---|---|---|---|
| FRAME SEQUENTIAL NUMBER | TIME INFORMATION | FRAME IMAGE DATA ADDRESS INFORMATION | FRAME IMAGE SIZE INFORMATION | FRAME LOW-PASS IMAGE ADDRESS INFORMATION | OBJECT INFORMATION TABLE ADDRESS INFORMATION | OBJECT INFORMATION SIZE INFORMATION |
| 0 | 0 | FM-Address0 | FM-Size0 | FMLP-Address1 | OBJT-Address1 | OBJT-Size1 |
| 1 | 1 | FM-Address1 | FM-Size1 | FMLP-Address2 | OBJT-Address2 | OBJT-Size2 |
|  |  |  |  |  | OBJT-Address3 | OBJT-Size3 |
|  |  |  |  |  | OBJT-Address2 | OBJT-Size2 |
|  |  |  |  |  | .. | .. |
| Frame-No | Times | FrameData-Address | Frame-Size | FMLP-Address | ObjectTable-Address | ObjectTable-Size |

FIG. 4

| OBJECT NUMBER 501 | OBJECT CLASSIFICATION INFORMATION ADDRESS INFORMATION 502 | OBJECT IMAGE POSITION INFORMATION 503 | INTEREST FLAG 504 |
|---|---|---|---|
| 1 | OBS-Address1 | OB-Point1 | true |
| 2 | OBS-Address2 | OB-Point2 | false |
| 3 | OBS-Address3 | OB-Point3 | false |
| ⋮ | ⋮ | ⋮ | ⋮ |
| 50 | OBS-Address50 | OB-Point50 | true |
| 51 | OBS-Address1 | OB-Point51 | false |
| 52 | OBS-Address2 | OB-Point52 | false |
| 53 | OBS-Address4 | OB-Point53 | false |

FIG. 6

| OBJECT CLASSIFICATION NUMBER (901) | DRAWING START FRAME NUMBER (902) | DRAWING END FRAME NUMBER (903) |
|---|---|---|
| 1 | 0 | 120 |
| 2 | 0 | 30 |
| 3 | 1 | 70 |
| ⋮ | | |
| 10 | 110 | 118 |
| 11 | 119 | 120 |

FIG. 10

| FRAME SEQUENTIAL NUMBER 1101 | TIME INFORMATION 1102 | FRAME IMAGE DATA ADDRESS INFORMATION 1103 | FRAME IMAGE SIZE INFORMATION 1104 | OBJECT INFORMATION TABLE ADDRESS INFORMATION 1105 | OBJECT INFORMATION SIZE INFORMATION 1106 |
|---|---|---|---|---|---|
| 0 | 0 | FM-Address0 | FM-Size0 | OBJT-Address1 | OBJT-Size1 |
| | | | | OBJT-Address2 | OBJT-Size2 |
| | | | | OBJT-Address3 | OBJT-Size3 |
| | | | | OBJT-Address2 | OBJT-Size2 |
| 1 | 1 | FM-Address1 | FM-Size1 | | |
| .. | .. | .. | .. | .. | .. |
| Frame-No | Times | FrameData-Address | Frame-Size | ObjectTable-Address | ObjectTable-Size |

FIG. 11

| OBJECT NUMBER 1201 | OBJECT CLASSIFICATION INFORMATION ADDRESS INFORMATION 1202 | OBJECT IMAGE DATA ADDRESS INFORMATION 1203 | OBJECT IMAGE DATA SIZE INFORMATION 1204 | OBJECT IMAGE POSITION INFORMATION 1205 | INTEREST FLAG 1206 | OBJECT LOW-PASS IMAGE ADDRESS INFORMATION 1207 | OBJECT LOW-PASS IMAGE SIZE INFORMATION 1208 |
|---|---|---|---|---|---|---|---|
| 1 | OBS-Address1 | OB-Address1 | OB-Size1 | OB-Point1 | true | OB-LP-Address1 | OB-LP-Size1 |
| 2 | OBS-Address2 | OB-Address2 | OB-Size2 | OB-Point2 | false | OB-LP-Address2 | OB-LP-Size2 |
| 3 | OBS-Address3 | OB-Address3 | OB-Size3 | OB-Point3 | false | OB-LP-Address3 | OB-LP-Size3 |
| .. | .. | .. | .. | .. | .. | .. | .. |
| 50 | OBS-Address50 | OB-Address50 | OB-Size50 | OB-Point50 | true | OB-LP-Address50 | OB-LP-Size50 |
| 51 | OBS-Address1 | OB-Address51 | OB-Size51 | OB-Point51 | false | OB-LP-Address51 | OB-LP-Size51 |
| 52 | OBS-Address2 | OB-Address52 | OB-Size52 | OB-Point52 | false | OB-LP-Address52 | OB-LP-Size52 |
| 53 | OBS-Address4 | OB-Address53 | OB-Size53 | OB-Point53 | false | OB-LP-Address53 | OB-LP-Size53 |

FIG. 13

| OBJECT NUMBER | OBJECT CLASSIFICATION INFORMATION ADDRESS INFORMATION | OBJECT IMAGE POSITION INFORMATION | OBJECT FEATURE AMOUNT INFORMATION | | |
|---|---|---|---|---|---|
| | | | FEATURE AMOUNT A | ⋮ | FEATURE AMOUNT Z |
| 1 | OBS-Address1 | OB-Point1 | OB-FeatureA1 | ⋮ | OB-FeatureZ1 |
| 2 | OBS-Address2 | OB-Point2 | OB-FeatureA2 | ⋮ | OB-FeatureZ2 |
| 3 | OBS-Address3 | OB-Point3 | OB-FeatureA3 | ⋮ | OB-FeatureZ3 |
| ⋮ | ⋮ | ⋮ | ⋮ | ⋮ | ⋮ |
| 50 | OBS-Address1 | OB-Point50 | OB-FeatureA50 | ⋮ | OB-FeatureZ50 |
| 51 | OBS-Address2 | OB-Point51 | OB-FeatureA51 | ⋮ | OB-FeatureZ51 |
| 52 | OBS-Address4 | OB-Point52 | OB-FeatureA52 | ⋮ | OB-FeatureZ52 |
| ⋮ | ⋮ | ⋮ | ⋮ | ⋮ | ⋮ |

FIG. 15

| OBJECT CLASSIFICATION NUMBER (901) | DRAWING START FRAME NUMBER (902) | DRAWING END FRAME NUMBER (903) | FRAME-OF-INTEREST OBJECT FEATURE AMOUNT INFORMATION (1504) | | |
|---|---|---|---|---|---|
| | | | FEATURE AMOUNT A | ... | FEATURE AMOUNT Z |
| 1 | 0 | 120 | 120 | ... | 120 |
| 2 | 0 | 30 | 30 | ... | 30 |
| 3 | 0 | 1 | 70 | ... | 70 |
| ... | ... | ... | ... | ... | ... |
| 10 | 110 | 118 | 118 | ... | 118 |
| 11 | 119 | 120 | 120 | ... | 120 |

IMAGE PROCESSING APPARATUS, IMAGE PROCESSING METHOD, AND COMPUTER PROGRAM

BACKGROUND OF THE INVENTION

1. Field of the Invention

The present invention relates to an image processing apparatus and image processing method and, more particularly, to an image processing apparatus and image processing method for playing back a moving image including a plurality of time-divided frame images.

2. Description of the Related Art

Generally, a human color perception model is designed to enable correct prediction of human color perception. A typical example is a color appearance model. The color appearance model copes with changes of viewing conditions. Since viewing information such as luminance, white point, and ambient relative luminance can be set as viewing condition parameters, the color appearance model can appropriately reproduce color appearance even under different viewing conditions.

An image appearance model is an extended color appearance model and reflects the human spatial visual characteristic and temporal visual characteristic. A known typical example is iCAM. Particularly, to predict the appearance of a moving image using the image appearance model, it is necessary to reflect the temporal visual characteristic such as light adaptation or color adaptation.

A technique of applying an image appearance model (iCAM) to a moving image is described in, for example, M. D. Fairchild and G. M. Johnson, "Image appearance modeling", SPIE/IS&T Electronic Imaging Conference, SPIE Vol. 5007, Santa Clara, 149-160 (2003). This reference describes the following technique. First, low-pass images and Y low-pass images (absolute luminance images) from a frame image 10 sec before to a frame image of interest are multiplied by an adaptation weight calculated by $$AW(f)=0.000261e^{0.000767f}+0.0276e^{0.0297f} \quad (1)$$

where AW is the calculated weight, and f is the frame number. More specifically, when the number of frames per sec is 30, f=0 represents the current frame number, and f=−300 represents the frame number 10 sec before.

The plurality of weighted low-pass images and Y low-pass images are composited to generate the low-pass image and Y low-pass image of a frame of interest. These images are used in the framework of iCAM, thereby playing back a moving image while reflecting the spatial and temporal visual characteristics.

A general moving image includes a plurality of objects. The objects have different features, for example, different drawing times. When viewing a moving image played back, there is normally an object that should receive attention (object of interest).

The technique described in the above reference performs uniform appearance processing in an overall frame image. Since the temporal visual characteristic and the like are uniformly reflected on the overall frame image, it is impossible to apply the temporal visual characteristic to each object of interest.

An example will be described with reference to FIG. 12. Referring to FIG. 12, assume that an observer is continuously viewing a car A from the start of 0 sec, which is 10 sec before the time of iCAM application. In this case, the car A in the frame image 120 sec after is close to complete adaptation, and the adaptation weight for the car A has a high value close to 1.

However, according to the method of non-patent reference 1 described above, since the temporal visual characteristic is reflected on the overall frame image, and the position of the car A moves, the adaptation weight has a low value. Referring to FIG. 12, when a car B is the object of interest, the above-described conventional method applies an adaptation time longer than the actual observation time of the car B. For this reason, the adaptation weight for the car B has a high value.

SUMMARY OF THE INVENTION

The present invention enables realization of an image processing apparatus and image processing method having a function of performing color conversion by applying an appropriate temporal visual characteristic to each object image in a frame image.

One aspect of the present invention provides an image processing apparatus for playing back a moving image including a plurality of time-divided frame images so as to reflect a human spatial visual characteristic and temporal visual characteristic, the apparatus comprising: an object extraction unit configured to extract object images from a frame image of interest in the plurality of frame images; an object adaptation time acquisition unit configured to acquire an object adaptation time of each of the extracted object images in a predetermined processing period up to the frame of interest; an object adaptation feature amount calculation unit configured to calculate an object adaptation feature amount of each object image based on the object adaptation time; and a color conversion unit configured to perform, for the frame image of interest, color conversion based on the object adaptation feature amount of each object image.

Another aspect of the present invention provides an image processing apparatus for playing back a moving image including a plurality of time-divided frame images so as to reflect a human spatial visual characteristic and temporal visual characteristic, the apparatus comprising: an object extraction unit configured to extract object images from a frame image of interest in the plurality of frame images; an object feature amount acquisition unit configured to acquire an object feature amount of each of the extracted object images; a color conversion preparing unit configured to perform, for the frame image of interest, color conversion preparing processing corresponding to the object feature amount of each object image to generate a color conversion image; a frame adaptation time acquisition unit configured to acquire a frame adaptation time in a predetermined processing period up to the frame of interest; a frame adaptation feature amount calculation unit configured to calculate a frame adaptation feature amount of the frame image of interest based on the frame adaptation time; and a color conversion unit configured to perform, for the frame image of interest, color conversion based on the color conversion image and the frame adaptation feature amount.

Still another aspect of the present invention provides an image processing apparatus for playing back a moving image including a plurality of time-divided frame images so as to reflect a human spatial visual characteristic and temporal visual characteristic, the apparatus comprising: an object extraction unit configured to extract object images from a frame image of interest in the plurality of frame images; an object feature amount acquisition unit configured to acquire an object feature amount of each of the extracted object images in a predetermined processing period up to the frame of interest; an object adaptation feature amount calculation unit configured to calculate an object adaptation feature amount of each object image based on the object feature amount; and a color conversion unit configured to perform, for the frame image of interest, color conversion based on the object adaptation feature amount of each object image.

Yet another aspect of the present invention provides an image processing method of playing back a moving image including a plurality of time-divided frame images so as to reflect a human spatial visual characteristic and temporal visual characteristic, the method comprising the steps of: causing an object extraction unit to extract object images from a frame image of interest in the plurality of frame images; causing an object adaptation time acquisition unit to acquire an object adaptation time of each of the extracted object images in a predetermined processing period up to the frame of interest; causing an object adaptation feature amount calculation unit to calculate an object adaptation feature amount of each object image based on the object adaptation time; and causing a color conversion unit to perform, for the frame image of interest, color conversion based on the object adaptation feature amount of each object image.

Still yet another aspect of the present invention provides an image processing method of playing back a moving image including a plurality of time-divided frame images so as to reflect a human spatial visual characteristic and temporal visual characteristic, the method comprising the steps of: causing an object extraction unit to extract object images from a frame image of interest in the plurality of frame images; causing an object feature amount acquisition unit to acquire an object feature amount of each of the extracted object images; causing a color conversion preparing unit to perform, for the frame image of interest, color conversion preparing processing corresponding to the object feature amount of each object image to generate a color conversion image; causing a frame adaptation time acquisition unit to acquire a frame adaptation time in a predetermined processing period up to the frame of interest; causing a frame adaptation feature amount calculation unit to calculate a frame adaptation feature amount of the frame image of interest based on the frame adaptation time; and causing a color conversion unit to perform, for the frame image of interest, color conversion based on the color conversion image and the frame adaptation feature amount.

Further features of the present invention will become apparent from the following description of exemplary embodiments with reference to the attached drawings.

BRIEF DESCRIPTION OF THE DRAWINGS

FIG. 3 is a view showing an example of the arrangement of a frame image information table according to the embodiment;

FIG. 4 is a view showing an example of the arrangement of an object information table according to the embodiment;

FIG. 6 is a view showing an example of the arrangement of an object classification information table according to the embodiment;

FIG. 10 is a view showing an example of the arrangement of a frame image information table according to the second embodiment;

FIG. 11 is a view showing an example of the arrangement of an object information table according to the second embodiment;

FIG. 13 is a view showing an example of the arrangement of an object information table according to the third embodiment;

FIG. 15 is a view showing an example of the arrangement of an object classification information table according to the third embodiment;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Apparatus Arrangement>

Figure 1:
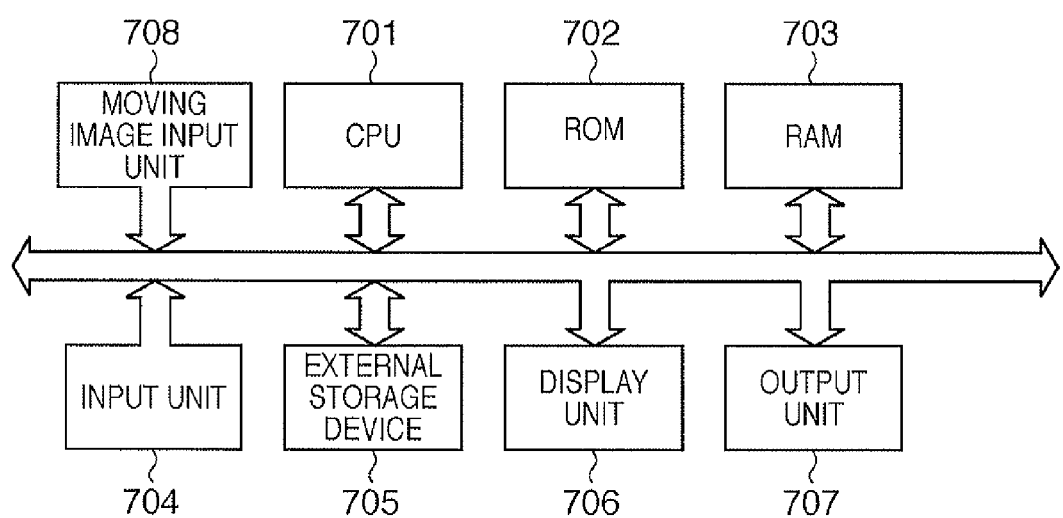
FIG. 1 is a block diagram showing an example of the block arrangement of an image processing apparatus according to an embodiment of the present invention.

FIG. 1 is a block diagram showing an example of the block arrangement of an image processing apparatus according to this embodiment. Referring to FIG. 1, a CPU 701 controls the operation of the overall apparatus in accordance with programs stored in a ROM 702 or an external storage device 705 such as a hard disk using a RAM 703 as a work memory. The CPU 701 also executes various kinds of image processing including processing associated with color matching of this embodiment.

An input unit 704 indicates input devices such as a keyboard and a mouse and their input interfaces and receives an input instruction from the operator. A display unit 706 represents a display device such as a monitor and a video interface and displays a moving image or a user interface window associated with the embodiment. An output unit 707 represents an output device such as a printer and an output device interface.

A moving image input unit 708 is a processing unit which receives moving image data from a device that handles moving image data, such as a video camera, digital camera, or video player, and processes the moving image data. For example, moving image data generally includes image data and audio data. They are separated into an image signal and an audio signal. The moving image input unit 708 includes an image A/D processing unit which receives the image signal as an analog signal and converts it into a digital signal, and an audio A/D processing unit which receives the audio signal as an analog signal and converts it into a digital signal. The moving image input unit 708 also includes a composition processing unit which compresses and composites the processed digital image signal and digital audio signal. The moving image input unit 708 also includes a decoding processing unit which receives moving image data encoded by an object encoding method such as MPEG4 and decodes the object code into the object image. The image data acquired by the moving image input unit 708 is converted into an image format such as JPEG or TIFF to obtain image data to be used for color matching.

<Outline of Moving Image Playback Processing>

Figure 2:
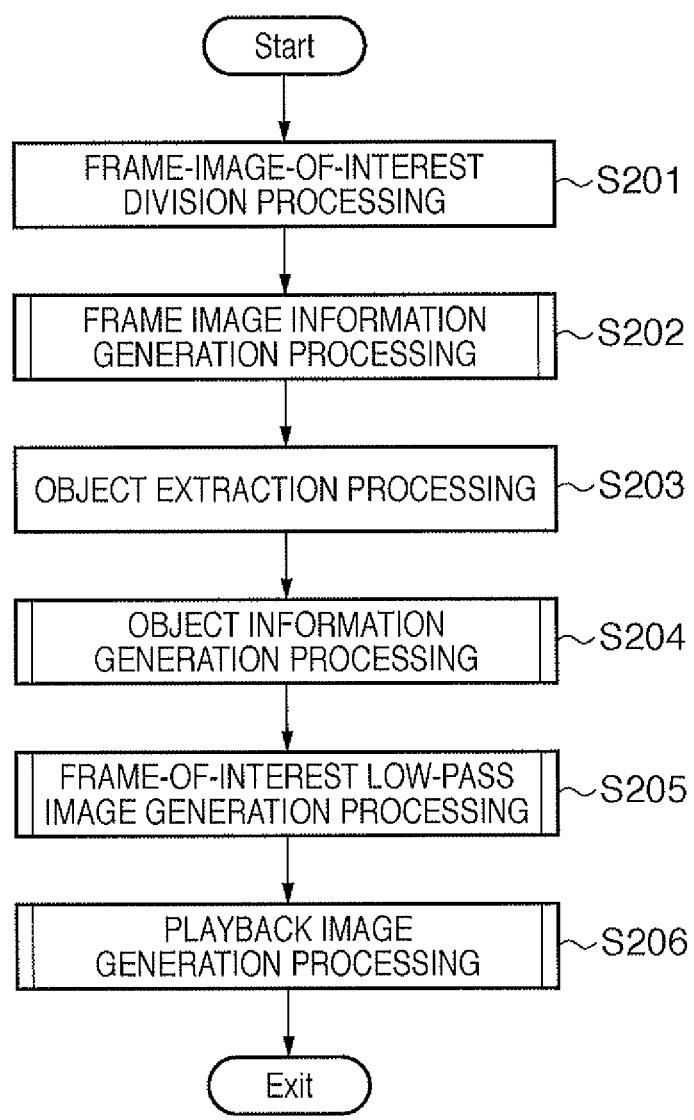
FIG. 2 is a flowchart illustrating moving image playback processing according to the embodiment.

FIG. 2 is a flowchart illustrating the outline of moving image playback processing by the image processing apparatus according to this embodiment. Each process will be described later in detail.

In step S201, moving image data input from the moving image input unit 708 shown in FIG. 1 is divided into still images at a predetermined time interval. Each of the divided still images will be referred to as a "frame image" hereinafter. A frame image that is a color matching processing target of this embodiment will be referred to as a "frame image of interest". That is, in step S201, moving image data is divided to generate a frame image of interest.

In step S202, frame image information for the frame image of interest is generated. In step S203, object extraction which is a characteristic feature of this embodiment is executed in the frame image of interest. In step S204, object information is generated, which is necessary for color matching processing reflecting the spatial visual characteristic and temporal visual characteristic of a human as a characteristic feature of this embodiment. In step S205, a low-pass image for the frame image of interest is generated based on the object information. In step S206, color matching processing is performed the frame image of interest using the generated low-pass image, thereby generating moving image data to be played back.

The processing of each step shown in FIG. 2 will be described below in detail.

<Frame-Image-of-Interest Division Processing (S201)>

Moving image data input from the moving image input unit 708 is time-divided at a specific or arbitrary time interval. The divided frame images are held in the ROM 702, RAM 703, or external storage device 705. At this time, frame image data address information 403 in a frame image information table shown in FIG. 3 (to be described later) stores an address representing the storage location of each frame image. Frame image size information 404 stores the data size of each frame image.

<Frame Image Information Generation Processing (S202)>

Pieces of information associated with each of the time-divided frame images are stored as the frame image information table shown in FIG. 3 in the ROM 702, RAM 703, or external storage device 705.

As shown in FIG. 3, the frame image information table of this embodiment includes a frame sequential number 401 as frame image information identification information representing number information to identify the information of a frame image. The frame image information table also includes time information 402 representing the time interval between the frames, that is, the interval of frame image drawing. The frame image information table also includes the frame image data address information 403 representing the address of each frame image data stored in the storage device, and the frame image size information 404 representing the data length of each frame image data. The frame image information table also includes frame low-pass image address information 405 representing the address of low-pass image data generated for each frame image in step S205 to be described later. The frame image information table also includes object information table address information 406 representing the address of an object information table which stores the information of each object included in each frame image, and object information size information 407 representing the data length of each object information table.

In this embodiment, the frame sequential number 401 representing the order of frame image playback is incremented and stored every time a frame image is extracted. When the frame images are divided at a specific time interval, the time information 402 stores the division time. For an arbitrary time interval, the time from the display start of the frame image immediately before the frame image of interest to the display time of the frame image of interest is acquired from a time processing device (internal clock) included in the standard equipment of the image processing apparatus.

<Object Extraction Processing (S203)>

In this processing, an object included in the frame image of interest is extracted to obtain object image data. A known method is used to extract an object, and the following technique is applicable.

According to a technique described in Japanese Patent Laid-Open No. 2004-248312, a block matching method is used to detect the motion of an object contained in a moving image formed from a plurality of continuous frame images. In the block matching method, a frame image is divided into blocks (regions). A similar position to the preceding image is searched by pattern matching in each block, thereby detecting an object included in a series of images. The detected object is expressed by region boundary information representing the boundary between the object and the background. It is possible to generate object image data based on the region boundary information.

An object encoding method is also known, in which a plurality of objects such as the background and persons are separated in the moving image, and encoding is performed for each object. The object encoding method is supported by the international standard (ISO/IEC MPEG4) of the moving image encoding method. Such an object encoding method allows to generate object image data by receiving an object code separated for each object and decoding it.

In this embodiment, new object information is registered in the object information table shown in FIG. 4 in correspondence with each object extracted from the frame image of interest by a certain method. An address representing object information is stored in the object information table address information 406 of the frame image information table shown in FIG. 3. The size of each object information is stored in the object information size information 407.

As shown in FIG. 4, the object information table of this embodiment stores items to be described below. The object information table includes an object number 501 representing the identification number of object information, and object classification information address information 502 representing the address to an object classification information table representing the classification of objects. The object classification information represents the element of each object that exists in a frame image. For example, "car A" shown in FIG. 9 to be described later is one classification. The object classification information will be described later in detail.

The object information table also includes object image position information 503 which stores the coordinate information of each extracted object. The object image position information 503 is the coordinate information of the region boundary of an object, which represents the relative position of each pixel when the upper left corner of a frame image is defined as (0,0), and the upper left corner of an object image is defined as (0,0). The coordinates are used for low-pass image generation for each object.

The object information table also includes an interest flag 504 representing whether the operator is paying attention to the object image. The interest flag 504 is switched between "true" (the operator pays attention) and "false" (the operator pays no attention) by determining on the basis of a known technique using an input of line of sight of the operator which object is receiving the attention of the operator. If the same processing should be performed for all objects without determining the object of interest, the interest flag is always set to "true", or the flag itself is not used.

That is, in the object extraction processing, the object number 501 and object image position information 503 are stored in the object information table shown in FIG. 4.

<Object Information Generation Processing (S204)>

Figure 5:
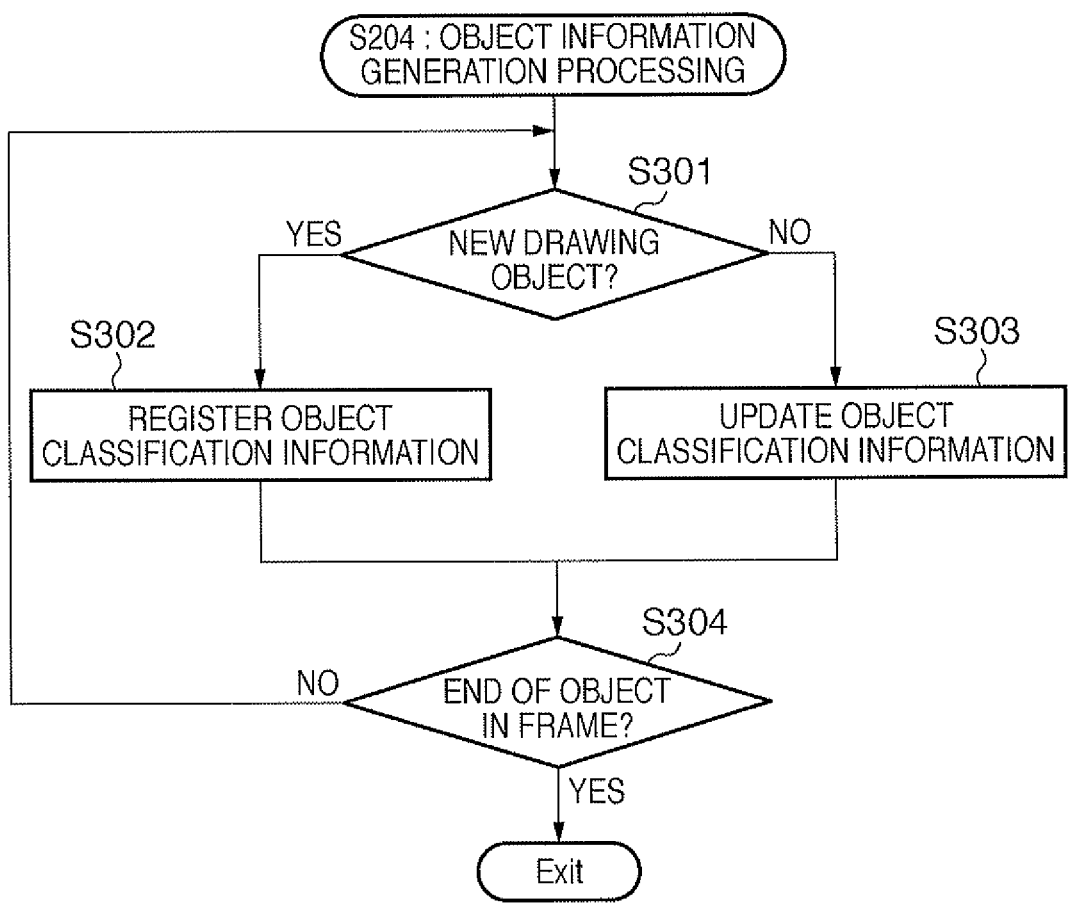
FIG. 5 is a flowchart illustrating object information generation processing according to the embodiment.

FIG. 5 is a flowchart illustrating the sequence of object information generation processing in step S204. First, it is determined whether object image data extracted by the object extraction processing in step S203 is already registered in the object classification information table (to be described later) for a frame image before the frame of interest (S301). This determination can be done by, for example, the following method. Referring to the frame sequential number 401 of the frame information table, frame information having a frame sequential number smaller than that of the frame image of interest by one is acquired. Referring to an object information table corresponding to the acquired frame information, an object image is extracted based on the object image position information 503. It is determined whether the extracted object image matches the object image extracted by the object extraction processing in step S203. If the object images match, the object image data can be determined as data that is already registered.

To determine matching between object images, for example, it is checked whether all pixels included in the object images match, as a matter of course. Alternatively, pattern matching may be performed for enlarged, reduced, or rotated object images. It may also be determined on the basis of the ratio of the matched size of the object image to the original size of the object image whether the object image is already registered. For a moving image using object encoding, an object signal to identify an object is acquired. It is therefore easy to determine matching of object images.

If it is determined in step S301 that the extracted object is not registered in the object classification information table, the information of the object is registered in the object classification information table as new object classification information in step S302.

FIG. 6 shows an example of the arrangement of the object classification information table. As shown in FIG. 6, the object classification information table of this embodiment includes an object classification number 901 to identify object classification. The object classification information table also includes a drawing start frame number 902 representing a frame number from which object drawing starts, and a drawing end frame number 903 representing a frame number at which object drawing ends.

To register new object classification information in the object classification information table, "1" is added to the maximum value of the object classification number 901 so that the new object classification number 901 is registered. The number of the frame of interest is registered in both the drawing start frame number 902 and the drawing end frame number 903. An address representing the registered object classification information is stored in the object classification information address information 502 of the object information table shown in FIG. 4.

On the other hand, if it is determined in step S301 that object classification information is already registered, the process advances to step S303 to update the registered object classification information. More specifically, "1" is added to the drawing end frame number 903 of the object classification information. In addition, the address of the already registered object classification information is stored in the object classification information address information 502 of the object information table shown in FIG. 4.

After the new registration processing in step S302 or the update processing in step S303 is ended, it is determined in step S304 whether object information is generated for all object images in the frame. If information is generated for all object images, the object information generation processing is ended. Otherwise, the process returns to step S301 to generate the next object information.

That is, in the object information generation processing in step S204, the object classification information address information 502 is stored in the object information table shown in FIG. 4.

<Frame-of-Interest Low-Pass Image Generation Processing (S205)>

Figure 7:
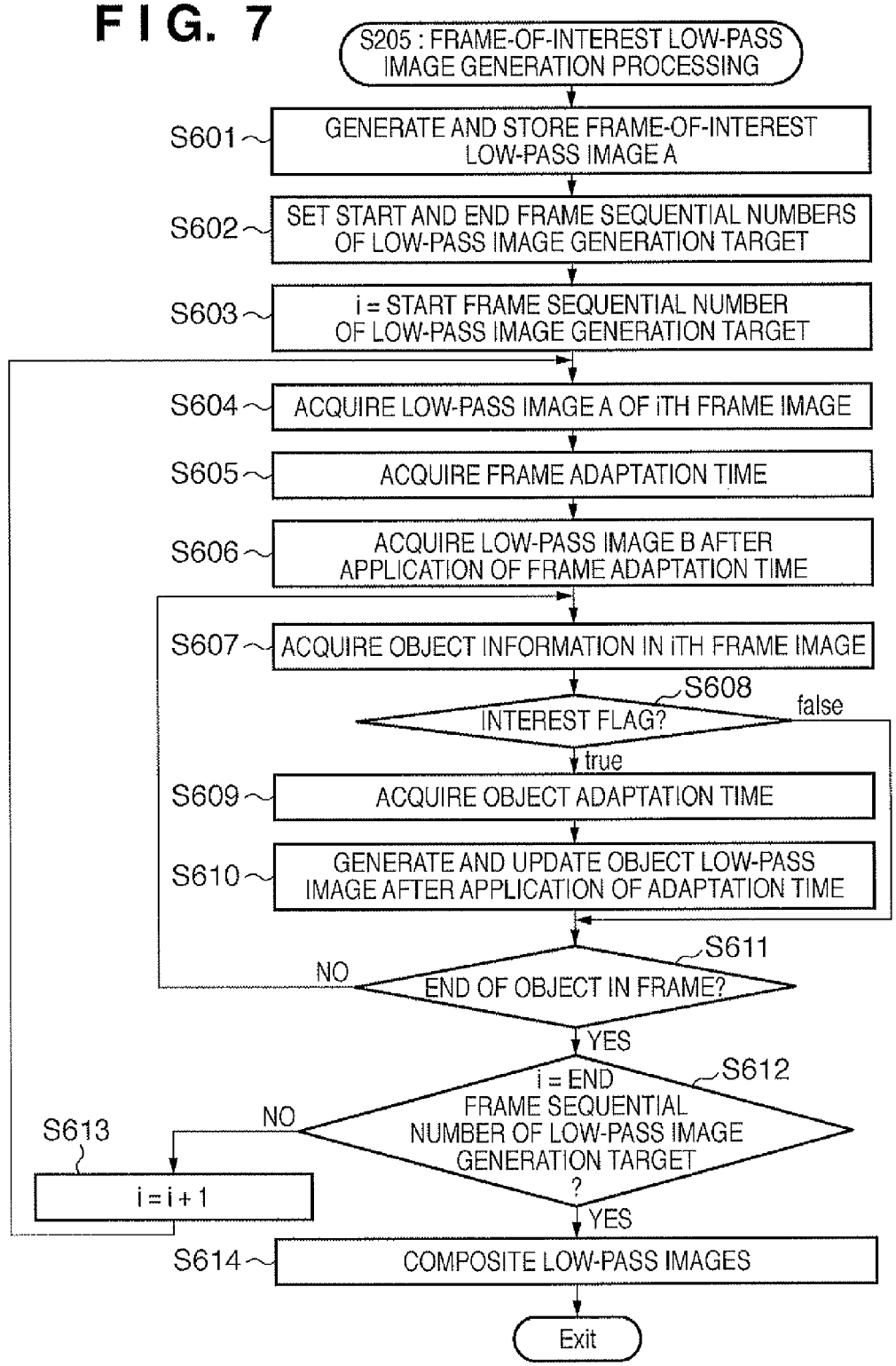
FIG. 7 is a flowchart illustrating frame-of-interest low-pass image generation processing according to the embodiment.

FIG. 7 is a flowchart illustrating the sequence of frame-of-interest low-pass image generation processing in step S205. First, a frame low-pass image A for the frame image of interest is generated and stored (S601). The frame low-pass image A is handled as an XYZ image, as in the technique described in non-patent reference 1. Hence, the frame low-pass image is generated by converting the frame image of interest into an XYZ image and applying a low-pass filter such as a Gaussian filter to the frame image of interest. The generated frame low-pass image A is stored in the ROM 702, RAM 703, or external storage device 705. Its address is stored in the frame low-pass image address information 405 of the frame image information table shown in FIG. 3.

Next, the frame sequential numbers of the start and end frames of the frame low-pass image generation target (to be described later) are acquired (S602). In this embodiment, a frame low-pass image is generated for each of the frame images which exist in the processing period between the frame of interest and the frame 10 sec before, as in the technique described in M. D. Fairchild and G. M. Johnson, "Image appearance modeling", SPIE/IS&T Electronic Imaging Conference, SPIE Vol. 5007, Santa Clara, 149-160 (2003). Hence, the frame sequential number of a frame corresponding to −10 sec from the frame of interest is set as the start frame sequential number of the low-pass image generation target. The frame sequential number of the frame of interest is set as the end frame sequential number of the low-pass image generation target. The time information of −10 sec is calculated based on the time information 402 of the frame image information table shown in FIG. 3. If no frame exactly corresponding to −10 sec exists, a frame closest to −10 sec is used.

The start frame sequential number of the low-pass image generation target set in step S602 is set in a low-pass image generation counter i (S603).

In steps S604 to S611, a frame low-pass image for one frame image is generated. The processing for one frame image will be explained below.

First, the frame low-pass image A of the frame image of interest is acquired based on the frame image information table shown in FIG. 3 (S604). Next, the adaptation time (frame adaptation time) of the ith frame image is acquired (S605). More specifically, the adaptation time of the ith frame image can be acquired by adding the pieces of time information of the respective frames from the frame image of interest to the ith frame image.

When the frame adaptation time acquisition processing in step S605 is ended, a frame low-pass image B is generated in step S606 by applying the frame adaptation time. More specifically, the frame low-pass image A generated in step S604 is multiplied by an adaptation weight AW as a frame adaptation feature amount. AW can be calculated by applying the frame adaptation time acquired in step S605 to equation (1). The frame low-pass image B after application of the frame adaptation time is thus generated.

In steps S607 to S611, an object low-pass image which reflects the temporal feature amount of each object in a frame image is generated.

First, a piece of object information in one frame image is acquired from the object information table shown in FIG. 4 (S607). The corresponding interest flag 504 is determined (S608). If the flag is "false", processing of determining whether to transfer to the next object information is performed (S612) without generating an object low-pass image.

If the interest flag is "true", the adaptation time of the object in the period from the drawing start frame of the object image to the target frame, that is, the ith frame is obtained for the frame low-pass image generation target frame image (S609). More specifically, referring to the object classification information table shown in FIG. 6, frames as the time information adding target are limited based on the drawing start frame number 902 and the drawing end frame number 903 of the object image. This enables to correctly reflect only the period during which the object is drawn.

The object adaptation time acquisition processing in step S609 is thus ended, an object low-pass image is generated in step S610 by applying the object adaptation time. More specifically, in the frame low-pass image B generated in step S606, an object region obtained from the object image position information 503 is multiplied by an adaptation weight AW as an object adaptation feature amount. AW can be calculated by applying the object adaptation time acquired in step S609 to equation (1). The object low-pass image after application of the object adaptation time is thus generated. That is, the object low-pass image is obtained by updating the object image region in the frame low-pass image B.

It is determined whether an object low-pass image is generated for each of the objects in the frame by applying the object adaptation time, that is, whether all object image regions in the frame low-pass image B are updated (S611). If the processing is ended for all objects, the process advances to step S612. Otherwise, the process returns to step S607.

When frame low-pass image generation for one frame image is ended, it is determined in step S612 whether the frame low-pass image B is generated for each of the target frames to be used to generate the frame low-pass image of the frame image of interest. That is, it is determined whether the frame low-pass image B is generated for each of the frame images from 10 sec before the frame image of interest. More specifically, it is determined whether the counter i corresponds to the sequential number of the end frame (i.e., the frame of interest) of the low-pass image generation target. If the processing is ended for all target frames, the process advances to step S614 to perform low-pass image composition processing. That is, all the generated frame low-pass images B are composited to generate an application low-pass image to be actually applied to the frame image of interest. If a target frame which has not undergone low-pass image generation remains, i is incremented by one in step S613, and the process returns to step S604.

<Playback Image Generation Processing (S206)>

Figure 8:
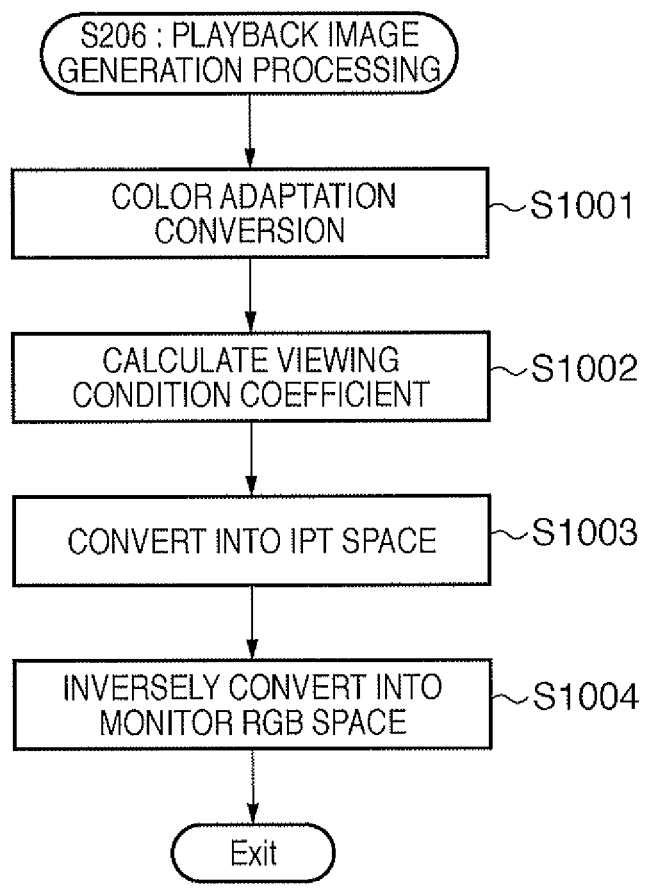
FIG. 8 is a flowchart illustrating playback image generation processing according to the embodiment.

FIG. 8 is a flowchart illustrating the sequence of playback image generation processing in step S206. In this example, the framework of iCAM is used, as in non-patent reference 1.

First, color adaptation conversion processing is performed (S1001) for the frame image of interest (XYZ image) and the frame low-pass image generated in step S205 based on $$\begin{bmatrix} R \\ G \\ B \end{bmatrix} = M_{CAT02} \begin{bmatrix} X \\ Y \\ Z \end{bmatrix} \quad (2)$$

$$M_{CAT02} = \begin{pmatrix} 0.7328 & 0.4296 & -0.1624 \\ -0.7036 & 1.6975 & 0.0061 \\ 0.0030 & 0.0136 & 0.9834 \end{pmatrix} \quad (3)$$

Let R, G, and B be the pixels of the frame image of interest converted by equation (2), and Rw, Gw, and Bw be the pixels of the low-pass image converted by equation (2). R, G, and B values (Rc, Gc, and Bc) after color adaptation are calculated by $$R_C = \left[100 \frac{D}{R_W} + (1-D)\right] R \quad (4)$$

$$G_C = \left[100 \frac{D}{G_W} + (1-D)\right] G \quad (5)$$

$$B_C = \left[100 \frac{D}{B_W} + (1-D)\right] B \quad (6)$$

where D is a parameter representing the degree of adaptation to the device white color, which takes values 0 (without adaptation) to 1 (complete adaptation).

A viewing condition coefficient FL is calculated for each pixel (S1002). The viewing condition FL is calculated, based on a Y low-pass image (absolute luminance image) generated from the Y value (YA) of the frame low-pass image, by $$F_L = 0.2 \left(\frac{1}{5Y_A+1}\right)^4 (5Y_A) + 0.1 \left(1 - \left(\frac{1}{5Y_A+1}\right)^4\right)^2 (5Y_A)^{\frac{1}{3}} \quad (7)$$

The R, G, and B values (Rc, Gc, and Bc) after adaptation, which are converted in step S1001, are converted into an IPT space (S1003). The IPT space is a rectangular parallelepiped color space in which I represents the degree of brightness/darkness, P represents the red-green tone, and T represents yellow-blue tone. The conversion processing to the IPT space will be described below in detail.

First, Rc, Gc, and Bc after adaptation are converted into a cone response space LMS in accordance with $$\begin{pmatrix} L \\ M \\ S \end{pmatrix} = M_{LMS} M_{CAT02}^{-1} \begin{pmatrix} R_C \\ G_C \\ B_C \end{pmatrix} \quad (8)$$

$$M_{LMS} = \begin{pmatrix} 0.4002 & 0.7075 & -0.0807 \\ -0.2280 & 1.1500 & 0.0612 \\ 0.0 & 0.0 & 0.9184 \end{pmatrix} \quad (9)$$

$$M_{CAT02}^{-1} = \begin{pmatrix} 1.096124 & -0.278869 & 0.182745 \\ 0.454369 & 0.473533 & 0.072098 \\ -0.009628 & -0.005698 & 1.015326 \end{pmatrix} \quad (10)$$

Nonlinear compression of cone response is applied in accordance with $$\begin{cases} L' = L^{0.43 F_L}; L \geq 0 \\ L' = -|L|^{0.43 F_L}; L \leq 0 \end{cases} \quad (11)$$

$$\begin{cases} M' = M^{0.43 F_L}; M \geq 0 \\ M' = -|M|^{0.43 F_L}; M \leq 0 \end{cases} \quad (12)$$

$$\begin{cases} S' = S^{0.43 F_L}; S \geq 0 \\ S' = -|S|^{0.43 F_L}; S \leq 0 \end{cases} \quad (13)$$

At this time, the FL value calculated by equation (7) is used.

Conversion to the IPT space is performed using $$\begin{pmatrix} I \\ P \\ T \end{pmatrix} = M_{IPT} \begin{pmatrix} L' \\ M' \\ S' \end{pmatrix} \quad (14)$$

$$M_{IPT} = \begin{pmatrix} 0.4000 & 0.4000 & 0.2000 \\ 4.4550 & -4.8510 & 0.3960 \\ 0.8056 & 0.3572 & -1.1628 \end{pmatrix} \quad (15)$$

When conversion to the IPT space is thus ended, the colors on the IPT space are inversely converted into the RGB space of the monitor which displays a moving image (S1004). Conversion from IPT to monitor RGB is done by inversely converting IPT values into adaptation RGB values, converting them into XYZ values corresponding to the observation environment of the monitor, and converting the XYZ values into monitor RGB values based on the characteristics of the monitor.

<Image Playback Considering Object of Interest>

Figure 9:
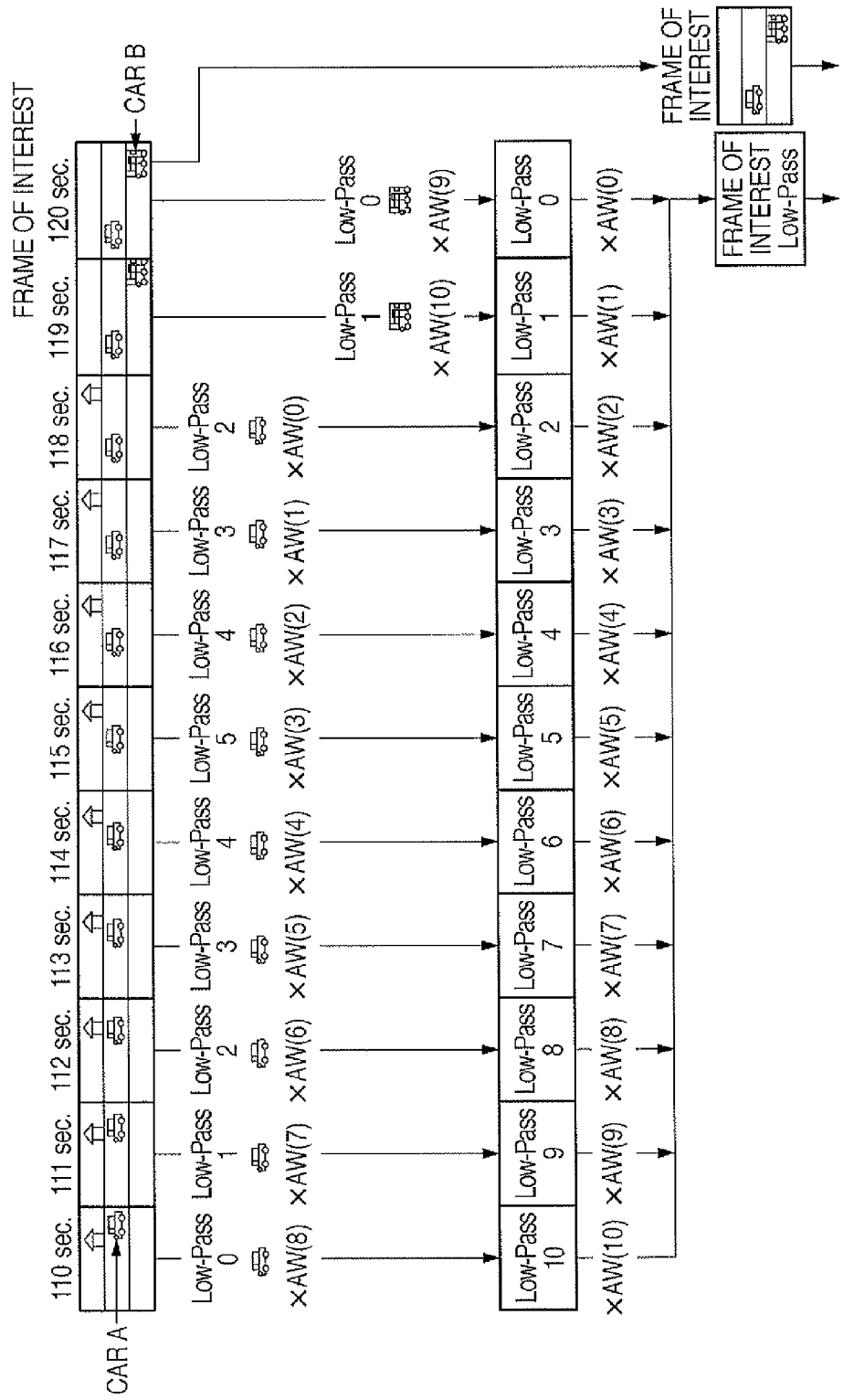
FIG. 9 is a schematic view showing a state in which the temporal visual characteristic for an object of interest is taken into consideration in appearance processing according to the embodiment.
Figure 12:
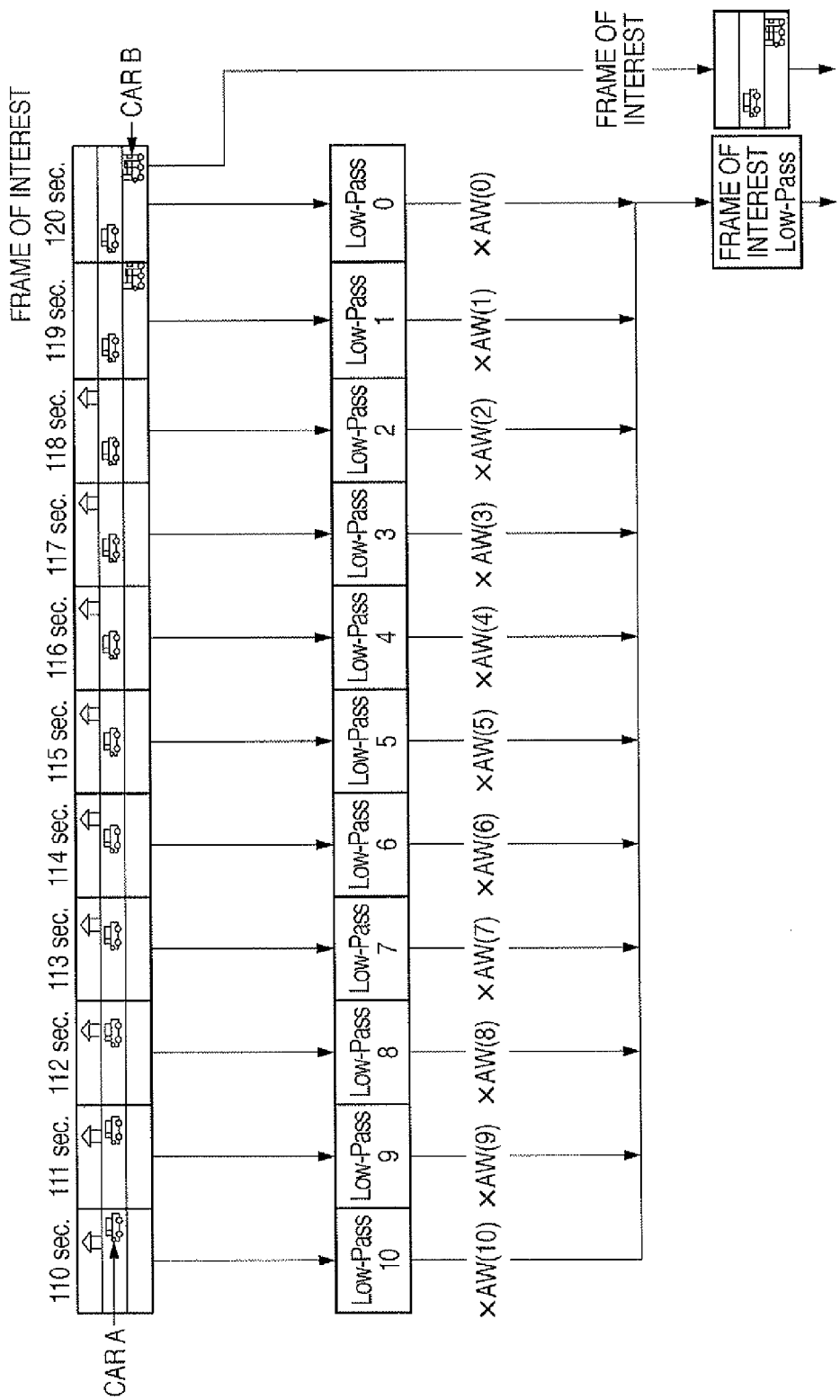
FIG. 12 is a schematic view showing a state in which the temporal visual characteristic is uniformly taken into consideration in conventional appearance processing.

FIG. 9 shows a state in which an object of interest is played back while reflecting the temporal visual characteristic in this embodiment. In FIG. 12 which shows the above-described conventional example, a low-pass image is uniformly generated for all frame images, that is, a uniform temporal visual characteristic is reflected. According to FIG. 9, however, the objects of interest, that is, the cars A and B in the frame undergo low-pass filter processing corresponding to the frame time to generate low-pass images for each frame. The low-pass images of a plurality of frames are composited based on the weight of equation (1), thereby generating the low-pass image for the frame of interest. As is apparent from FIG. 9, playback considering an object of interest is possible because a temporal visual characteristic different from that for a background object is reflected on each object of interest.

As described above, according to this embodiment, it is possible to apply a temporal visual characteristic for each object. This enables playback by applying an appropriate temporal visual characteristic to an object which should receive particular attention so that an appearance without any sense of incongruity for the observer is implemented.

Second Embodiment

The second embodiment of the present invention will be described below. In the above-described first embodiment, a frame image itself is held in the storage unit, and the object image position information 503 shown in FIG. 4 is used to acquire an object image in the frame image. As a characteristic feature of the second embodiment, an object image is held independently of a frame image.

FIG. 10 shows an example of a frame image information table according to the second embodiment. It is different from the frame image information table shown in FIG. 3 of the above-described first embodiment in that no frame low-pass image (frame low-pass image address information 405 in FIG. 3) is held.

FIG. 11 shows an example of an object information table according to the second embodiment. As a characteristic feature of the second embodiment, the object information table shown in FIG. 11 holds the information of object images and object low-pass images for all objects including a background image.

Moving image playback processing of the second embodiment is fundamentally almost the same as in the above-described first embodiment except the method of accessing an object image and its low-pass image. In, for example, object extraction processing, an extracted object image is held in a ROM 702, RAM 703, or external storage device 705, and the address of the object image is stored in object image data address information 1203. The size of the object image is stored in object image data size information 1204.

In the second embodiment, an object low-pass image is held for each object. An object low-pass image generated for an object is held in the ROM 702, RAM 703, or external storage device 705. The address of the low-pass image is stored in object low-pass image address information 1207. The size of the low-pass image is stored in object low-pass image size information 1208.

Object image position information 1205 in the object information table shown in FIG. 11 need not hold the coordinates of pixels in the whole region of an object. It is necessary to hold only, for example, the start coordinates of the upper left corner.

As described above, according to the second embodiment, it is possible to apply a temporal visual characteristic for each object, as in the above-described first embodiment, by holding an object image independently of a frame image. Additionally, since access to object data is easy, the processing speed increases as a whole.

Third Embodiment

The third embodiment of the present invention will be described below. The same arrangements as in FIGS. 1 to 3 are applied, and a description thereof will not be repeated. As a characteristic feature of the third embodiment, an object feature amount is calculated, unlike the first and second embodiments.

As shown in FIG. 13, the object information table of this embodiment stores items to be described below. The same reference numerals as in FIG. 4 denote the same parts in FIG. 13, and a description thereof will not be repeated. As a characteristic feature, the object information table includes object feature amount information 1304 representing, for example, the moving speed and size of an object, unlike FIG. 4.

<Object Information Generation Processing (S204)>

Figure 14:
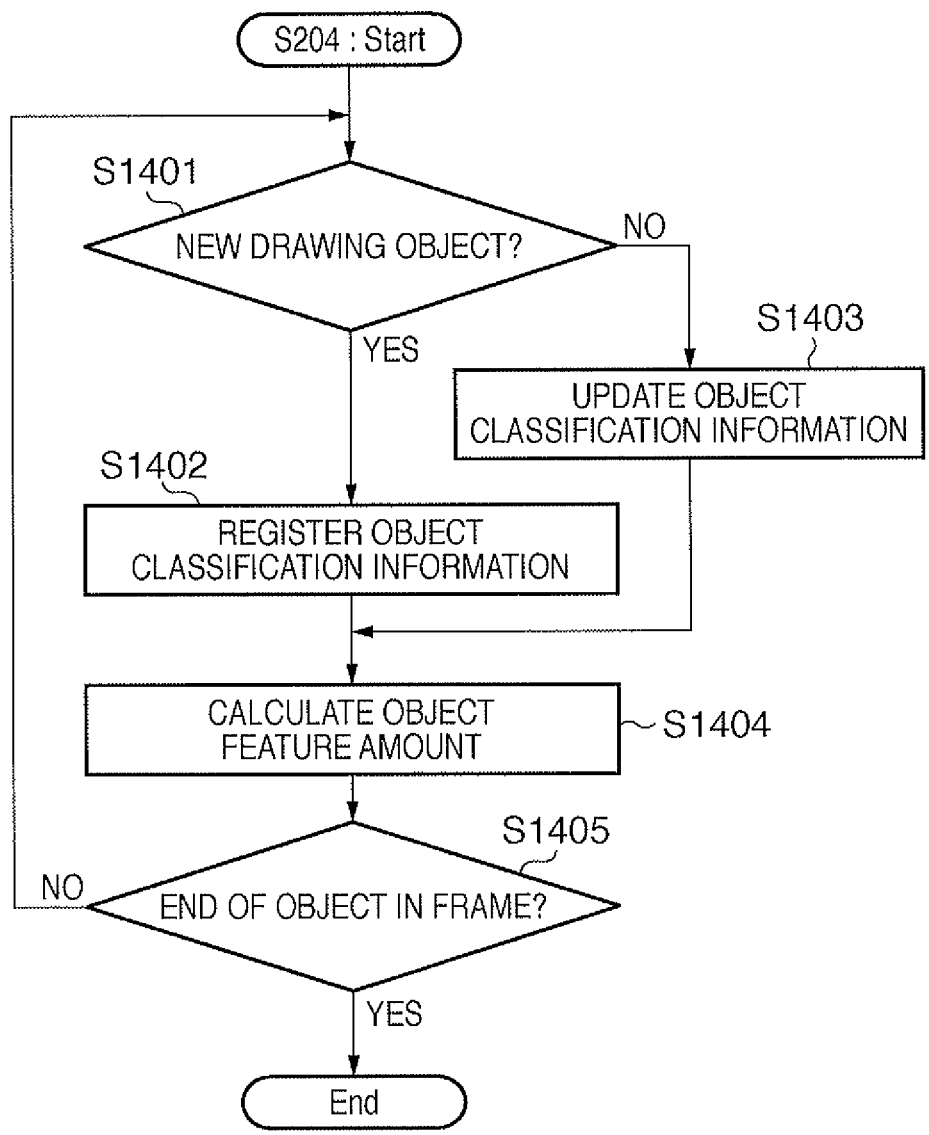
FIG. 14 is a flowchart illustrating the sequence of object information generation processing according to the third embodiment.

FIG. 14 is a flowchart illustrating the sequence of object information generation processing in step S204 of FIG. 2. First, it is determined whether object image data extracted by the object extraction processing in step S203 is already registered in the object classification information table (to be described later) for a frame image before the frame of interest (S1401). This determination can be done by, for example, the following method. Referring to a frame sequential number 401 of the frame information table, frame information having a frame sequential number smaller than that of the frame image of interest by one is acquired. Referring to an object information table corresponding to the acquired frame information, an object image is extracted based on object image position information 503. It is determined whether the extracted object image matches the object image extracted by the object extraction processing in step S203. If the object images match, the object image data can be determined as data that is already registered.

To determine matching between object images, for example, it is checked whether all pixels included in the object images match, as a matter of course. Alternatively, pattern matching may be performed for enlarged, reduced, or rotated object images. It may also be determined on the basis of the ratio of the matched size of the object image to the original size of the object image whether the object image is already registered. For a moving image using object encoding, an object signal to identify an object is acquired. It is therefore easy to determine matching of object images.

If it is determined in step S1401 that the extracted object is not registered in the object classification information table, the information of the object is registered in the object classification information table as new object classification information in step S1402.

FIG. 15 shows an example of the arrangement of the object classification information table. As shown in FIG. 15, the object classification information table of this embodiment includes an object classification number 901 to identify object classification. The object classification information table also includes a drawing start frame number 902 representing a frame number from which object drawing starts, and a drawing end frame number 903 representing a frame number at which object drawing ends. The object classification information table also includes frame-of-interest object feature amount information 1504 representing the object feature amount in the frame of interest (i.e., drawing end frame).

To register new object classification information in the object classification information table, "1" is added to the maximum value of the object classification number 901 so that the new object classification number 901 is registered. The number of the frame image of interest is registered in both the drawing start frame number 902 and the drawing end frame number 903. An address representing the registered object classification information is stored in object classification information address information 502 of the object information table shown in FIG. 13.

On the other hand, if it is determined in step S1401 that object classification information is already registered, the process advances to step S1403 to update the registered object classification information. More specifically, "1" is added to the drawing end frame number 903 of the object classification information. In addition, the address of the already registered object classification information is stored in the object classification information address information 502 of the object information table shown in FIG. 13.

After the new registration processing in step S1402 or the update processing in step S1403 is ended, the feature amount of the object is calculated in step S1404. This will be explained using the "moving speed" of the object as an example of the object feature amount. The moving speed of the object is calculated, based on, for example, a difference ΔPos of the object image position information 503 and a difference ΔT of time information 402 between the frame of interest and the immediately preceding frame (frame sequential number of frame of interest −1), by $$V(f) = \frac{\Delta Pos(f, f-1)}{\Delta T(f, f-1)} \quad (16)$$

where f is the frame number. When the object is a newly drawn object, V(f)=0.

The "moving speed" of the object has been described here as an example of the object feature amount. Any other feature amount such as the "moving acceleration" or "size" of the object is also usable. The "moving acceleration" can be calculated by dividing V(f) of equation (16) by ΔT. The size can be calculated by calculating the concatenated components of the object. Alternatively, the object image position information 503 stored in the object information table shown in FIG. 4 may be used as the object feature amount.

The calculated object feature amount is stored in the object feature amount information 1304 of the object information table shown in FIG. 13 and the frame-of-interest object feature amount information 1504 of the object classification information table shown in FIG. 15. If the object is not a new object, the frame-of-interest object feature amount information 1504 is updated by overwrite.

When the object feature amount is thus calculated in step S1404, it is determined in step S1405 whether object information is generated for all object images in the frame. If information is generated for all object images, the object information generation processing is ended. Otherwise, the process returns to step S1401 to generate the next object information.

That is, in the object information generation processing in step S204, the object classification information address information 502 and object feature amount information 1304 are stored in the object information table shown in FIG. 13.

<Frame-of-Interest Low-Pass Image Generation Processing (S205)>

Figure 16:
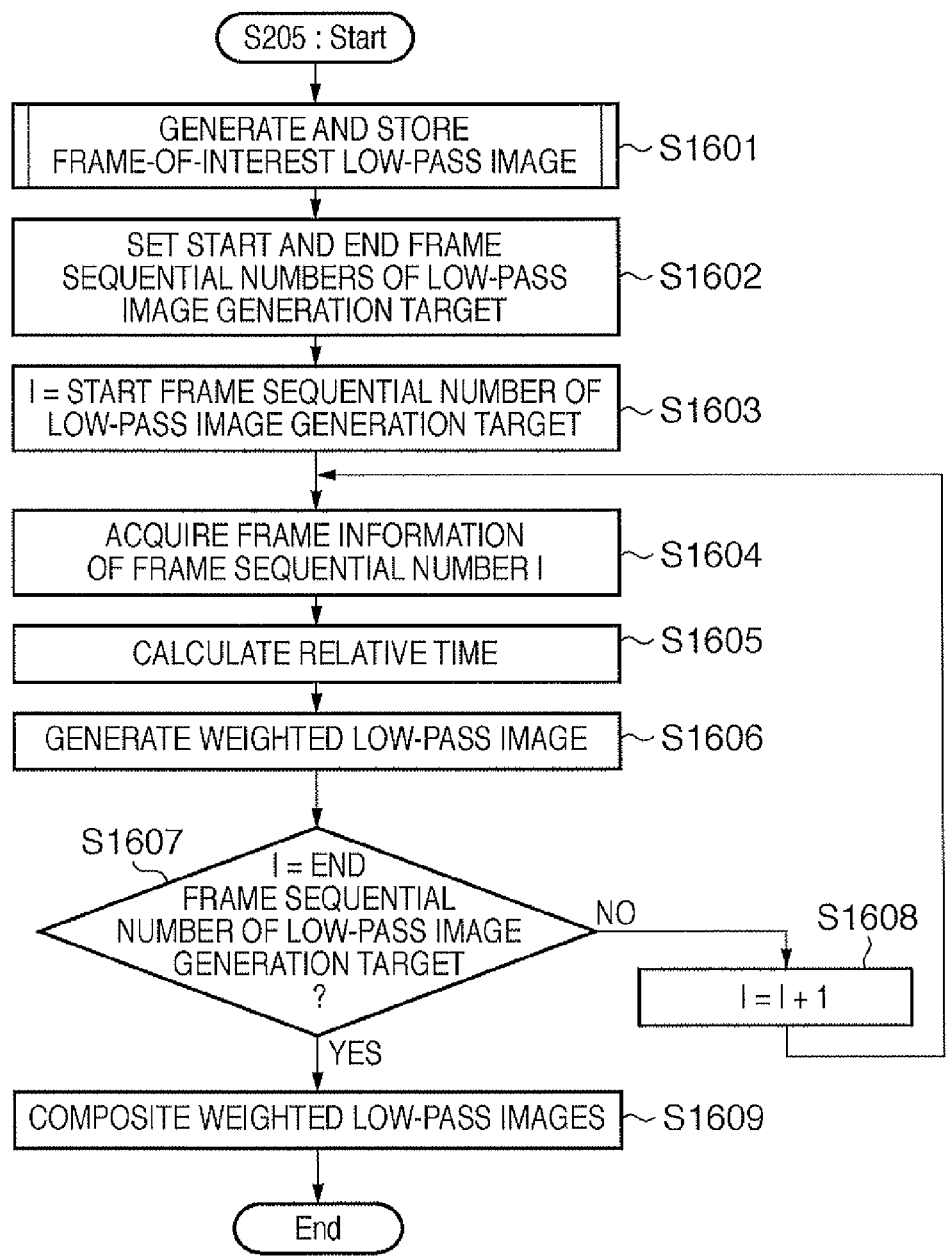
FIG. 16 is a flowchart illustrating frame-of-interest low-pass image generation processing according to the third embodiment.

FIG. 16 is a flowchart illustrating the sequence of frame-of-interest low-pass image generation processing in step S205.

In step S1601, a frame low-pass image for the frame image of interest is generated and stored, and its address information is set in the frame image information table shown in FIG. 3. The frame low-pass image is handled as an XYZ image. Hence, the low-pass image is generated by converting the frame image of interest into an XYZ image and applying a low-pass filter such as a Gaussian filter to it. Low-pass image generation processing corresponding to the object feature amount, which is a characteristic feature of this embodiment, is performed in step S1601. This will be described later in detail.

Next, the frame sequential numbers of the start and end frames of a weighted low-pass image generation target (to be described later) are acquired (S1602). In this embodiment, a low-pass image is generated for each of the frame images which exist in the processing period between the frame of interest and the frame 10 sec before, as in the technique described in M. D. Fairchild and G. M. Johnson, "Image appearance modeling", SPIE/IS&T Electronic Imaging Conference, SPIE Vol. 5007, Santa Clara, 149-160 (2003). Hence, the frame sequential number of a frame corresponding to −10 sec from the frame of interest is set as the start frame sequential number of the low-pass image generation target. The frame sequential number of the frame of interest is set as the end frame sequential number of the low-pass image generation target. The time information of −10 sec is calculated based on the time information 402 of the frame image information table shown in FIG. 3. If no frame exactly corresponding to −10 sec exists, a frame closest to −10 sec is used.

The start frame sequential number of the low-pass image generation target set in step S1602 is set in a low-pass image generation counter i (S1603).

In steps S1604 to S1606, a frame low-pass image for one frame image is generated. The processing for one frame image will be explained below.

First, the frame low-pass image and time information of the frame sequential number represented by the low-pass image generation counter i are acquired from the frame image information table shown in FIG. 3 (S1604). The relative time of the frame image is calculated based on the time information of the frame of interest and the time information of the frame of the frame sequential number i (S1605). The relative time corresponds to the frame adaptation time. If 30 frames are drawn per sec, the adaptation time is 0 for the frame of interest, and −300 for a frame corresponding to −10 sec.

When the frame adaptation time acquisition processing in step S1605 is ended, a weighted low-pass image is generated in step S1606 by applying the frame adaptation time. More specifically, the frame low-pass image acquired in step S1604 is multiplied by a low-pass weight AW as a frame adaptation feature amount. AW can be calculated by applying the frame adaptation time acquired in step S1605 to equation (1). A weighted low-pass image which reflects the temporal visual characteristic is thus generated.

It is determined whether the low-pass image generation counter i corresponds to the end frame (i.e., the frame of interest) of the low-pass image generation target (S1607). If the counter does not correspond to the end frame, the low-pass image generation counter i is incremented by one (S1608), and the process returns to step S1604. If the counter corresponds to the end frame, the weighted low-pass images of the frames, which are generated in step S1606, are composited to generate a low-pass image for the frame of interest (S1609).

<Details of Low-Pass Image Generation Processing (S1601)>

Figure 17:
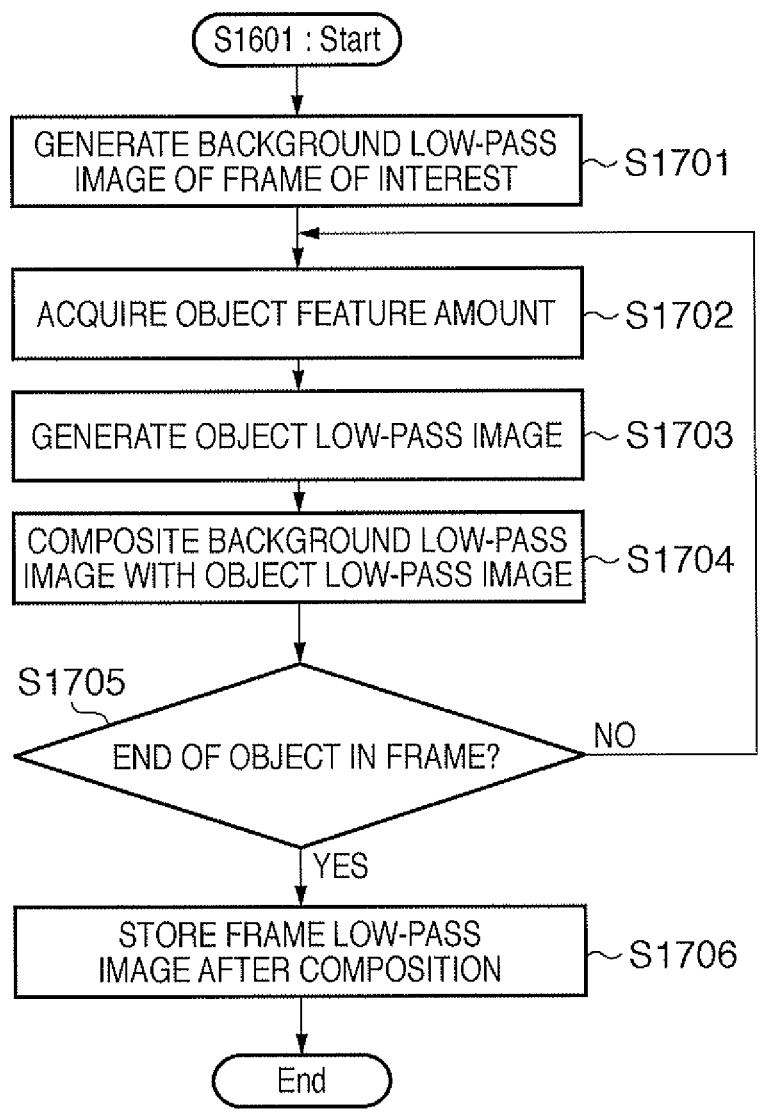
FIG. 17 is a flowchart illustrating frame low-pass image generation processing for a frame of interest according to the third embodiment.

FIG. 17 is a flowchart illustrating the frame low-pass image generation processing for the frame of interest in step S1601.

In step S1701, the background low-pass image of the frame of interest is generated. The background low-pass image is obtained by applying a Gaussian filter that is a low-pass filter to the frame image of interest, as in the technique described in M. D. Fairchild and G. M. Johnson, "Image appearance modeling", SPIE/IS&T Electronic Imaging Conference, SPIE Vol. 5007, Santa Clara, 149-160 (2003). The low-pass processing here is not limited to filtering using a Gaussian filter. Any other low-pass processing using another low-pass filter or based on the human contrast sensitivity characteristic may be performed.

In steps S1702 and S1703, the low-pass image of each object in the frame image of interest is generated by changing processing in accordance with the object feature amount as a characteristic feature of this embodiment.

In step S1702, the object feature amount of one object in the frame image of interest is acquired. The object feature amount is acquired using the frame-of-interest object feature amount information 1504 stored in the object classification information table shown in FIG. 15 or the object feature amount information 1304 in the object information table shown in FIG. 13. In this case, the "moving speed" feature amount in the frame of interest, which is stored in the frame-of-interest object feature amount information 1504, is acquired.

In step S1703, as color conversion preparing processing of this embodiment, the color conversion image, that is, low-pass image of the object is generated. In this case, the filter size of the low-pass filter is changed in accordance with the "moving speed" of the object acquired in step S1702. The change can be done stepwise by, for example, preparing three "large", "medium", and "small" filters of different sizes and applying a larger filter to an object having a higher moving speed. Alternatively, a continuous change may be done using a function which has the moving speed as the input and the filter size as the output and outputs a smaller value corresponding to a lower moving speed.

In the above-described example, the "moving speed" of the object is used as the object feature amount to be used to change the filter processing. Instead, any other feature amount such as the "moving acceleration", "size", or "position information" of the object may be used. A plurality of feature amounts may be combined.

In step S1704, the object low-pass image generated in step S1703 is composited with the background low-pass image generated in step S1701. More specifically, the object low-pass image is overwritten on the object region of the background low-pass image.

In step S1705, it is determined whether the processing is ended for all objects in the frame. If an unprocessed object remains, the process returns to step S1702. If the processing is ended for all objects, the process advances to step S1706.

In step S1706, the background low-pass image in which all object low-pass images are composited is stored in a ROM 702, RAM 703, or external storage device 705 as a frame low-pass image. Its address is stored in frame low-pass image address information 405 of the frame image information table shown in FIG. 3.

The low-pass image of the frame of interest is generated in the above-described way by the processing described with reference to the flowcharts in FIGS. 16 and 17.

Figure 18:
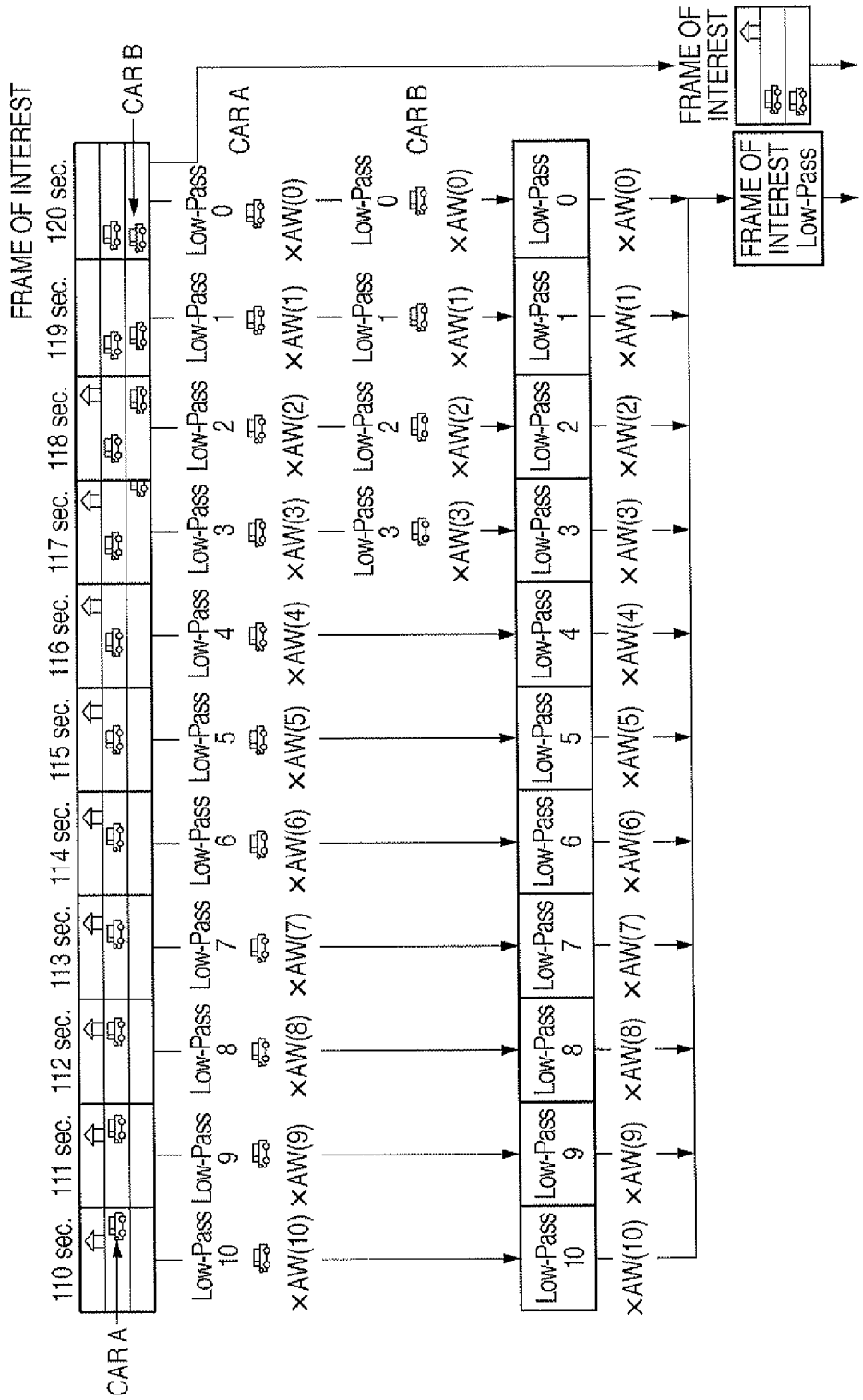
FIG. 18 is a schematic view showing a state in which low-pass image generation corresponding to an object feature amount is performed in appearance processing according to the third embodiment.

FIG. 18 schematically shows the above-described operation. As is apparent from FIG. 18, processing corresponding to the object feature amount (moving speed) is performed for each of objects, that is, cars A and B. More specifically, low-pass filter processing corresponding to the moving speed is performed for each of the objects, cars A and B, thereby generating the low-pass image of each frame. Then, the low-pass images of the plurality of frames are composited based on the weighting of equation (1), thereby generating the low-pass image of the frame of interest.

<Playback Image Generation Processing (S206)>

The playback image generation processing in step S206 is the same as in FIG. 8 of the first embodiment, and a description thereof will not be repeated.

As described above, according to this embodiment, the low-pass image generation processing is changed based on the feature amount of each object in a frame. This allows applying more appropriate appearance processing to a moving image.

Fourth Embodiment

The fourth embodiment of the present invention will be described below. Moving image playback processing of the fourth embodiment is almost the same as in the above-described third embodiment except the frame-of-interest low-pass image generation processing in step S205. The frame-of-interest low-pass image generation processing according to the fourth embodiment will be described below. The remaining processes are the same as in the above-described third embodiment, and a description thereof will not be repeated.

<Frame-of-Interest Low-Pass Image Generation Processing (S205)>

Figure 19:
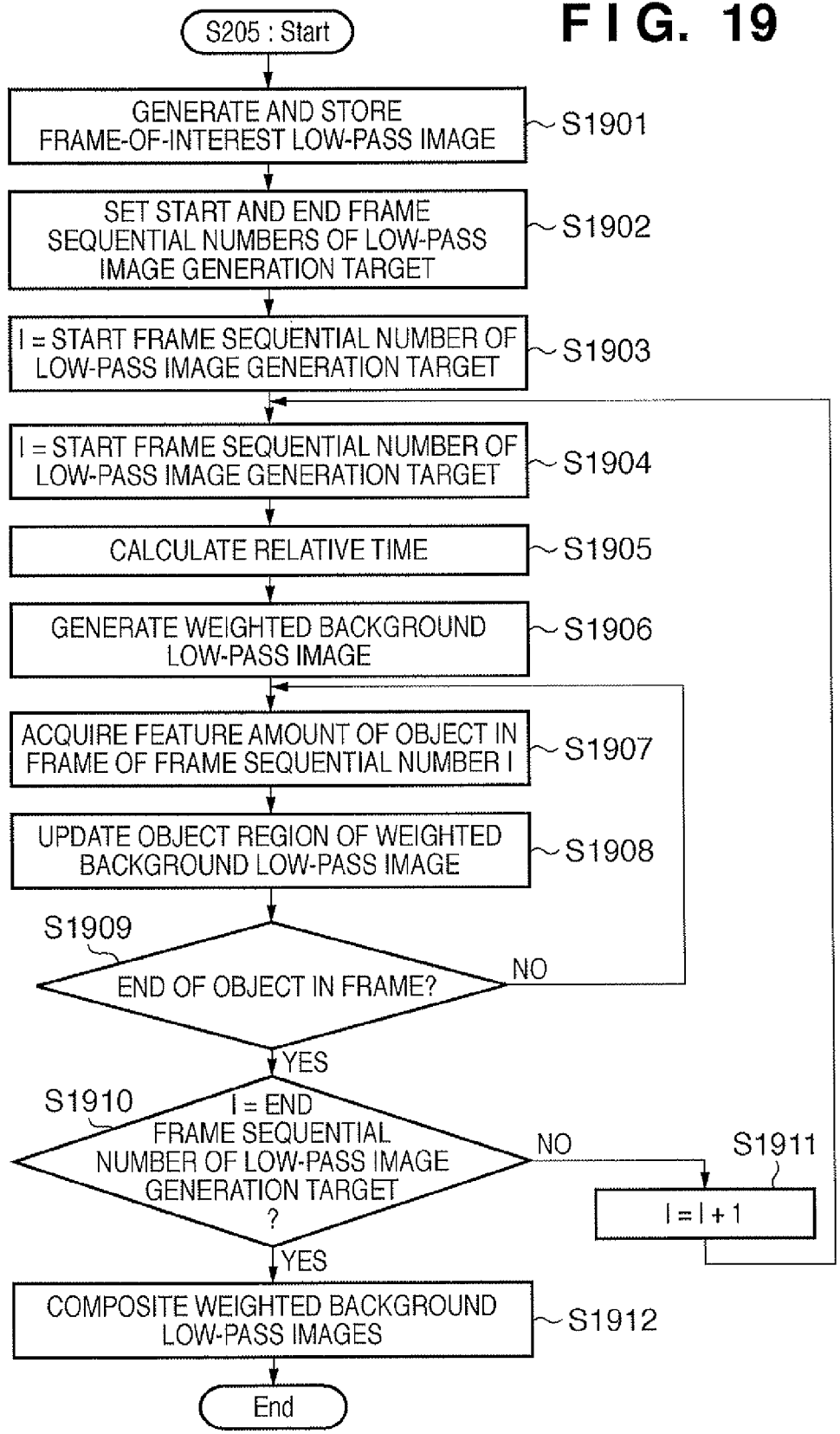
FIG. 19 is a flowchart illustrating the sequence of frame-of-interest low-pass image generation processing according to the fourth embodiment.

FIG. 19 is a flowchart illustrating frame-of-interest low-pass image generation processing according to the fourth embodiment. In the fourth embodiment, the timing of executing processing corresponding to the object feature amount is different from the processing shown in the flowchart of FIG. 16 in the above-described third embodiment. More specifically, in the third embodiment, the processing corresponding to the object feature is performed for the frame of interest in step S1601. In the fourth embodiment, however, the object feature amount is used not only for the frame of interest but also for preceding frames, as will be described later.

In step S1901, a frame low-pass image for the frame image of interest is generated and stored. The frame low-pass image is handled as an XYZ image. Hence, the low-pass image is generated by converting the frame image of interest into an XYZ image and applying a low-pass filter such as a Gaussian filter to it. The generated frame low-pass image is stored in a ROM 702, RAM 703, or external storage device 705, and its address is stored in frame low-pass image address information 405 of the frame image information table shown in FIG. 3. In step S1901, the low-pass image generation processing corresponding to the object feature amount is not executed, unlike step S1601 of FIG. 16 in the third embodiment.

Next, the frame sequential numbers of the start and end frames of a weighted low-pass image generation target (to be described later) are acquired (S1902). In this embodiment, a low-pass image is generated for each of the frame images which exist between the frame of interest and the frame 10 sec before, as in the technique described in M. D. Fairchild and G. M. Johnson, "Image appearance modeling", SPIE/IS&T Electronic Imaging Conference, SPIE Vol. 5007, Santa Clara, 149-160 (2003). Hence, the frame sequential number of a frame corresponding to −10 sec from the frame of interest is set as the start frame sequential number of the low-pass image generation target. The frame sequential number of the frame of interest is set as the end frame sequential number of the low-pass image generation target. The time information of −10 sec is calculated based on time information 402 of the frame image information table shown in FIG. 3. If no frame exactly corresponding to −10 sec exists, a frame closest to −10 sec is used.

The start frame sequential number of the low-pass image generation target set in step S1902 is set in a low-pass image generation counter i (S1903).

In steps S1904 to S1908, a frame low-pass image for one frame image is generated. The processing for one frame image will be explained below.

First, the frame low-pass image and time information of the frame sequential number represented by the low-pass image generation counter i are acquired from the frame image information table shown in FIG. 3 (S1904). The relative time of the frame image is calculated based on the time information of the frame of interest and the time information of the frame of the frame sequential number i (S1905).

A weighted low-pass image is generated based on the relative time (S1906). More specifically, a low-pass weight AW is calculated from equation (1) based on the relative time calculated in step S1905. The frame low-pass image acquired in step S1904 is multiplied by the low-pass weight AW. A weighted low-pass image that reflects the temporal visual characteristic is thus generated. The low-pass image will be referred to as a weighted background low-pass image hereinafter.

In steps S1907 and S1908, the weighted low-pass image of each object in the frame image is generated by changing processing in accordance with the object feature amount as a characteristic feature of this embodiment.

In step S1907, the object feature amount of one object in the frame image having a frame sequential number i is acquired. The object feature amount is acquired using object feature amount information 1304 stored in the object information table shown in FIG. 13 in correspondence with each frame. In this case, the "moving speed" feature amount is used.

In step S1908, a weight is set for the object image region in the weighted background low-pass image generated in step S1906, thereby updating the weighted background low-pass image. For example, a weight function VW(V) for a moving speed V is defined, which becomes close to 1 as the moving speed V increases, and 0 as the moving speed V decreases. The weight VW for the moving speed is calculated based on the moving speed of the object acquired in step S1907. The weight VW is the object adaptation feature amount of this embodiment. The data of the object image region in the weighted background low-pass image generated in step S1906 is multiplied by the weight VW, thereby generating a low-pass image having a weight corresponding to the object feature amount.

Figure 20:
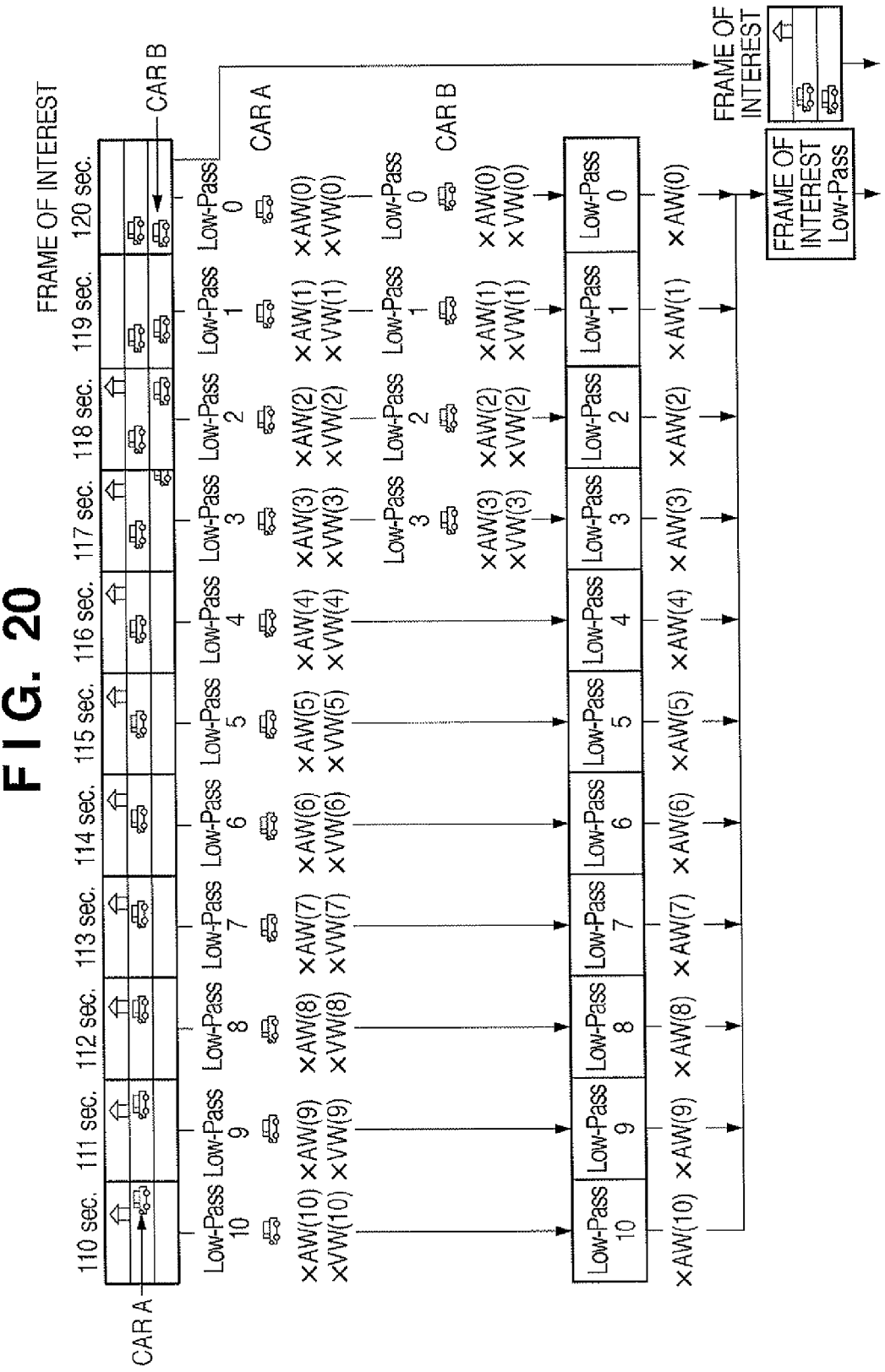
FIG. 20 is a schematic view showing a state in which low-pass image generation corresponding to an object feature amount is performed in appearance processing according to the fourth embodiment

FIG. 20 schematically shows the above-described operation. As is apparent from FIG. 20, weighting (VW) based on the object feature amount (moving speed) in each frame is performed for each of objects, that is, cars A and B, thereby generating the weighted low-pass image of the frame of interest.

In the above-described example, the "moving speed" of the object is used as the object feature amount to be used to calculate the weight for the object. Instead, any other feature amount such as the "moving acceleration", "size", or "position information" of the object may be used. A plurality of feature amounts may be combined.

It is determined whether object low-pass images of all objects in the frame are generated by applying the adaptation times of the respective objects (S1909). If the processing is ended for all objects, the process advances to step S1910. If an unprocessed object remains, the process returns to step S1907.

In step S1910, it is determined whether the low-pass image generation counter i corresponds to the end frame (i.e., the frame of interest) of the low-pass image generation target. If the counter does not correspond to the end frame, the low-pass image generation counter i is incremented by one (S1911), and the process returns to step S1904. If the counter corresponds to the end frame, the plurality of weighted low-pass images generated in step S1908 are composited to generate a low-pass image for the frame of interest (S1912).

In this embodiment, the weight value of the object low-pass image is changed in accordance with the feature amount, thereby implementing processing change corresponding to the object feature amount. However, the filter size may be changed, as in the above-described third embodiment.

As described above, according to this embodiment, it is possible to obtain the same effect as in the above-described third embodiment and also more specifically control the temporal visual characteristic using not only the feature amount of the frame of interest but also those of preceding frames.

Other Embodiments

The embodiments of the present invention have been described above in detail. The present invention can take a form of, for example, a system, apparatus, method, program, or recording medium (storage medium). More specifically, the present invention is applicable to a system including a plurality of devices (e.g., host computer, interface device, image capturing apparatus, and web application) or an apparatus including a single device.

The present invention is also achieved by supplying a software program which implements the functions of the above-described embodiments to the system or apparatus directly or from a remote site and causing the computer of the system or apparatus to read out and execute the supplied program codes. In this case, the program is computer-readable and corresponds to the flowcharts illustrated in the embodiments.

Hence, the program code itself, which is installed in a computer to implement the functional processing of the present invention by the computer, also implements the present invention. That is, the present invention incorporates the computer program itself for implementing the functional processing of the present invention.

In this case, the program can take any form such as an object code, a program to be executed by an interpreter, or script data to be supplied to the OS as long as the functions of the program can be obtained.

Examples of the recording medium to supply the program are a Floppy® disk, hard disk, optical disk, magnetooptical disk, MO, CD-ROM, CD-R, CD-RW, magnetic tape, non-volatile memory card, ROM, and DVD (DVD-ROM or DVD-R).

Another program supply method to be described below is also applicable. A client computer is connected to a homepage on the Internet by using a browser to download the computer program itself of the present invention (or a compressed file containing an automatic installation function) from the homepage to a recording medium such as a hard disk. The program code contained in the program of the present invention may be divided into a plurality of files, and the files may be downloaded from different homepages. That is, a WWW server which causes a plurality of users to download a program file that causes a computer to implement the functional processing of the present invention is also incorporated in the present invention.

The program of the present invention may be encrypted, stored in a storage medium such as a CD-ROM, and distributed to users. Any user who satisfies predetermined conditions may be allowed to download key information for decryption from a homepage via the Internet. The user can execute the encrypted program by using the key information and install the program in the computer.

The functions of the above-described embodiments are implemented when the computer executes the readout program. The functions of the above-described embodiments are also implemented when, for example, the OS running on the computer partially or wholly executes actual processing based on the instructions of the program.

The functions of the above-described embodiments are also implemented when the program read out from the recording medium is written in the memory of a function expansion board inserted into the computer or a function expansion unit connected to the computer and executed. More specifically, the CPU of the function expansion board or function expansion unit can partially or wholly execute actual processing based on the instructions of the program.

According to the present invention having the above-described arrangement, it is possible to perform color conversion by applying an appropriate temporal visual characteristic to each object image in a frame image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-307892 filed on Nov. 28, 2007 and Japanese Patent Application No. 2007-307893 filed on Nov. 28, 2007, which are hereby incorporated by reference herein in their entirety.

What is claimed is:

1. An image processing apparatus for playing back a moving image including a plurality of time-divided frame images so as to reflect a human spatial visual characteristic and temporal visual characteristic, the apparatus comprising:

an object extraction unit configured to extract object images from a frame image of interest in the plurality of frame images and to store a flag representing whether or not an operator is paying attention to the extracted object image, wherein the flag corresponds to the extracted object image and is based on an input of line of sight of the operator;

an object adaptation time acquisition unit configured to acquire an object adaptation time of each of the extracted object images for which a flag is stored representing that the operator is paying attention, based on a period during which the extracted object is drawn in a predetermined processing period up to the frame of interest;

an object adaptation feature amount calculation unit configured to calculate an object adaptation feature amount of each object image based on the acquired object adaptation time, wherein the object adaptation feature amount represents an adaptation weight reflecting the human temporal visual characteristic with respect to the extracted object images; and a color conversion unit configured to perform, for the frame image of interest, color conversion based on the calculated object adaptation feature amount of each object image.

2. The apparatus according to claim 1, further comprising:

a frame adaptation time acquisition unit configured to acquire a frame adaptation time of the frame image of interest in the processing period, wherein the frame adaptation time represents the adaptation weight reflecting the human temporal visual characteristic with respect to the extracted object images; and a frame adaptation feature amount calculation unit configured to calculate a frame adaptation feature amount of the frame image of interest based on the frame adaptation time, wherein said color conversion unit performs, for the frame image of interest, color conversion based on the frame adaptation feature amount and the object adaptation feature amount of each object image.

3. The apparatus according to claim 2, further comprising:

a frame low-pass image generation unit configured to generate a frame low-pass image of the frame image of interest based on the frame adaptation feature amount; and an object low-pass image generation unit configured to generate an object low-pass image of each object image in the frame of interest based on the object adaptation feature amount and composite the object low-pass image with the frame low-pass image, wherein said color conversion unit performs color adaptation conversion by a color appearance model based on the frame low-pass image composited with the object low-pass image.

4. The apparatus according to claim 3, further comprising a low-pass image composition unit configured to composite frame low-pass images of the plurality of frame images in the processing period, which are composited with object low-pass images, to generate an application low-pass image, wherein said color conversion unit performs color adaptation conversion by a color appearance model based on the application low-pass image.

5. The apparatus according to claim 3, wherein said object low-pass image generation unit generates the object low-pass image of one of the object images in the frame of interest, for which a flag to instruct generation of the object low-pass image is set.

6. An image processing method of playing back a moving image including a plurality of time-divided frame images so as to reflect a human spatial visual characteristic and temporal visual characteristic, the method comprising the steps of:

causing an object extraction unit to extract object images from a frame image of interest in the plurality of frame images and to store a flag representing whether or not an operator is paying attention to the extracted object image, wherein the flag corresponds to the extracted object image and is based on an input of line of sight of the operator;

causing an object adaptation time acquisition unit to acquire an object adaptation time of each of the extracted object images for which a flag is stored representing that the operator is paying attention, based on a period during which the extracted object id drawn in a predetermined processing period up to the frame of interest;

causing an object adaptation feature amount calculation unit to calculate an object adaptation feature amount of each object image based on the acquired object adaptation time, wherein the object adaptation feature amount represents an adaptation weight reflecting the human temporal visual characteristic with respect to the extracted object images; and causing a color conversion unit to perform, for the frame image of interest, color conversion based on the calculated object adaptation feature amount of each object image.

7. A computer-readable storage medium storing a computer program which is executed by a computer to cause the computer to function as an image processing apparatus of claim 1.

* * * * *